United States Patent
Baker

(10) Patent No.: US 7,456,885 B2
(45) Date of Patent: Nov. 25, 2008

(54) PER COLUMN ONE-BIT ADC FOR IMAGE SENSORS

(75) Inventor: R. Jacob Baker, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 1152 days.

(21) Appl. No.: 10/645,575

(22) Filed: Aug. 22, 2003

(65) Prior Publication Data

US 2005/0041128 A1   Feb. 24, 2005

(51) Int. Cl.
H04N 3/14 (2006.01)
H03M 1/00 (2006.01)

(52) U.S. Cl. ...................... 348/308; 341/126
(58) Field of Classification Search ......... 348/294–324, 348/241; 341/126
See application file for complete search history.

(56) References Cited

U.S. PATENT DOCUMENTS

| | | | | |
|---|---|---|---|---|
| 4,293,874 A * | 10/1981 | Reneau | | 348/697 |
| 4,998,170 A * | 3/1991 | Nohara | | 348/694 |
| 5,229,761 A * | 7/1993 | Fuse | | 345/99 |
| 5,465,067 A * | 11/1995 | Anderson | | 327/322 |
| 5,563,654 A * | 10/1996 | Song | | 348/223.1 |
| 5,886,659 A * | 3/1999 | Pain et al. | | 341/155 |
| 6,140,630 A | 10/2000 | Rhodes | | |
| 6,154,160 A * | 11/2000 | Meyer et al. | | 341/139 |
| 6,204,524 B1 | 3/2001 | Rhodes | | |
| 6,310,366 B1 | 10/2001 | Rhodes et al. | | |
| 6,333,205 B1 | 12/2001 | Rhodes | | |
| 6,376,868 B1 | 4/2002 | Rhodes | | |
| 6,433,822 B1 * | 8/2002 | Clark et al. | | 348/241 |
| 6,448,912 B1 | 9/2002 | Berezin | | |
| 6,476,860 B1 * | 11/2002 | Yadid-Pecht et al. | | 348/172 |
| 6,515,701 B2 * | 2/2003 | Clark et al. | | 348/308 |
| 6,628,216 B2 * | 9/2003 | Chen et al. | | 341/120 |
| 6,704,050 B1 * | 3/2004 | Washkurak et al. | | 348/294 |
| 6,975,540 B2 * | 12/2005 | Kato | | 365/185.2 |
| 7,023,482 B2 * | 4/2006 | Sakuragi | | 348/308 |
| 7,189,951 B2 * | 3/2007 | Sakurai | | 250/208.1 |
| 7,227,488 B2 * | 6/2007 | Cho | | 341/155 |
| 7,379,124 B2 * | 5/2008 | George et al. | | 348/745 |
| 2001/0025969 A1 * | 10/2001 | Inui | | 257/225 |
| 2003/0160882 A1 * | 8/2003 | Henno et al. | | 348/301 |
| 2003/0197797 A1 * | 10/2003 | Segura | | 348/300 |
| 2004/0027471 A1 * | 2/2004 | Koseki et al. | | 348/300 |

* cited by examiner

*Primary Examiner*—David Ometz
*Assistant Examiner*—Pritham Prabhakher
(74) *Attorney, Agent, or Firm*—Dickstein Shapiro LLP

(57) ABSTRACT

A per column one-bit analog-to-digital converter for an image sensor. The analog-to-digital converter utilizes the difference between a reference signal current and a pixel signal current to obtain a digital output representative of the analog pixel signal in an efficient and simple manner. The output of the one-bit analog-to-digital converter is fed to a counter to give a representation of the brightness of the light-to-charge conversion in the associated pixel. The analog-to-digital converter does not use a reference voltage and precision elements and thus, does not suffer from power supply, noise and precision variations.

18 Claims, 13 Drawing Sheets

PER COLUMN ONE-BIT ADC FOR IMAGE SENSORS

FIELD OF THE INVENTION

The invention relates generally to imaging devices, and more particularly to a per column one-bit analog-to-digital converter (ADC) for an image sensor.

BACKGROUND

Imaging devices, including charge coupled devices (CCD) and complementary metal oxide semiconductor (CMOS) imagers, are commonly used in photo-imaging applications.

A CMOS imager circuit includes a focal plane array of pixel cells, each one of the cells including either a photogate, photoconductor or a photodiode overlying a substrate for accumulating photo-generated charge in the underlying portion of the substrate. A readout circuit is connected to each pixel cell and includes at least an output field effect transistor formed in the substrate and a charge transfer section formed on the substrate adjacent the photogate, photoconductor or photodiode having a sensing node, typically a floating diffusion node, connected to the gate of an output transistor. The imager may include at least one electronic device such as a transistor for transferring charge from the underlying portion of the substrate to the floating diffusion node and one device, also typically a transistor, for resetting the node to a predetermined charge level prior to charge transference.

In a CMOS imager, the active elements of a pixel cell perform the necessary functions of: (1) photon to charge conversion; (2) accumulation of image charge; (3) transfer of charge to the floating diffusion node accompanied by charge amplification; (4) resetting the floating diffusion node to a known state before the transfer of charge to it; (5) selection of a pixel for readout; and (6) output and amplification of a signal representing pixel charge. Photo charge may be amplified when it moves from the initial charge accumulation region to the floating diffusion node. The charge at the floating diffusion node is typically converted to a pixel output voltage by a source follower output transistor. The photosensitive element of a CMOS imager pixel is typically either a depleted p-n junction photodiode or a field induced depletion region beneath a photogate. For photodiodes, image lag can be eliminated by completely depleting the photodiode upon readout.

CMOS imagers of the type discussed above are generally known as discussed, for example, in U.S. Pat. Nos. 6,140,630, 6,376,868, 6,310,366, 6,326,652, 6,204,524 and 6,333,205, assigned to Micron Technology, Inc., which are hereby incorporated by reference in their entirety.

FIG. 1 illustrates a block diagram for a CMOS imager 10. The imager 10 includes a pixel array 20. The pixel array 20 comprises a plurality of pixels arranged in a predetermined number of columns and rows. The pixels of each row in array 20 are all turned on at the same time by a row select line and the pixels of each column are selectively output by a column select line. A plurality of rows and column lines are provided for the entire array 20.

The row lines are selectively activated by the row driver 32 in response to row address decoder 30 and the column select lines are selectively activated by the column driver 36 in response to column address decoder 34. Thus, a row and column address is provided for each pixel. The CMOS imager 10 is operated by the control circuit 40, which controls address decoders 30, 34 for selecting the appropriate row and column lines for pixel readout, and row and column driver circuitry 32, 36, which apply driving voltage to the drive transistors of the selected row and column lines.

The pixel signal output from the pixel array is analog voltage. This pixel output signal must be converted from an analog signal to a digital signal. Thus, the pixel output signal is usually sent to an analog-to-digital converter (ADC) (not shown in FIG. 1). Many CMOS image sensors use a ramp analog-to-digital converter, which is essentially a comparator and associated control logic. In the conventional ramp analog-to-digital converter, an input voltage of the signal to be converted is compared with a gradually increasing reference voltage. The gradually increasing reference voltage is generated by a digital-to-analog converter ("DAC") as it sequences through and converts digital codes into analog voltages. This gradually increasing reference voltage is known as the ramp voltage. In operation, when the ramp voltage reaches the value of the input voltage, the comparator generates a signal that latches the digital code of the DAC. The latched digital code is used as the output of the analog-to-digital converter.

Unfortunately, variation in the power supply, noise and precision of the reference voltage adversely impacts the performance of the analog-to-digital converters used in today's image sensors. Accordingly, there is a need and desire for an improved analog-to-digital converter for image sensors. There is also a need and desire to reduce the amount of power consumed during the operation of the image sensor.

SUMMARY

The present invention provides an improved analog-to-digital converter for image sensors, which reduces the circuitry and power consumption of the image sensor.

The above and other features and advantages are achieved in various embodiments of the invention by providing a per column one-bit analog-to-digital converter for an image sensor. The analog-to-digital converter utilizes the difference between a reference signal current and a pixel signal current to obtain a digital output representative of the analog pixel signal in an efficient and simple manner. The output of the one-bit analog-to-digital converter is fed to a counter to obtain a representation of the brightness of the light-to-charge conversion in the associated pixel. The analog-to-digital converter does not use a reference voltage, digital-to-analog convert and/or precision elements and thus, does not suffer from power supply, noise and precision variations.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION

In the following detailed description, reference is made to the accompanying drawings, which are a part of the specification, and in which is shown by way of illustration various embodiments whereby the invention may be practiced. These embodiments are described in sufficient detail to enable those skilled in the art to make and use the invention. It is to be understood that other embodiments may be utilized, and that structural, logical, and electrical changes, as well as changes in the materials used, may be made without departing from the spirit and scope of the present invention.

Figure 1:
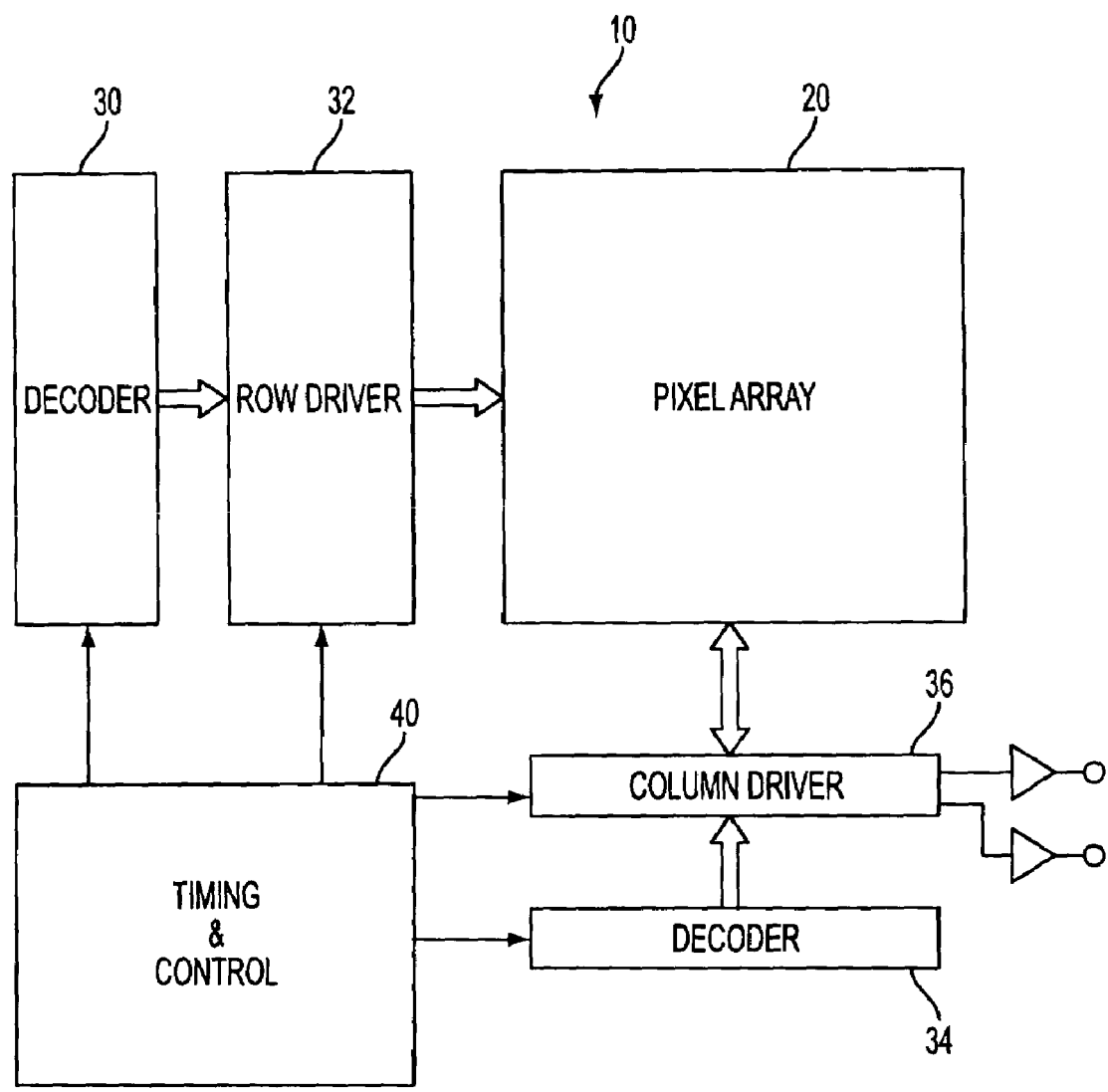
FIG. 1 is a block diagram of a CMOS image sensor.
Figure 2:
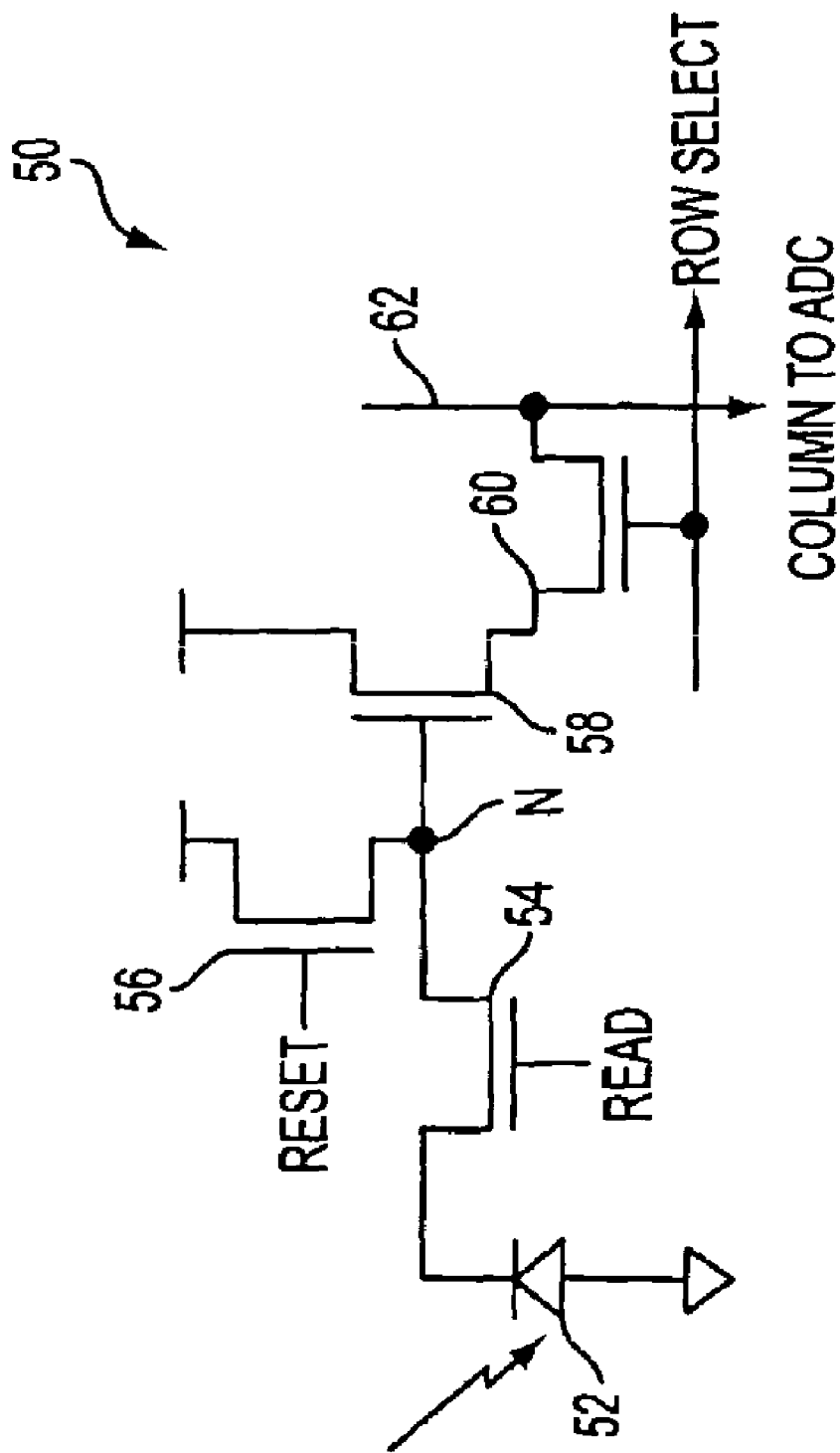
FIG. 2 illustrates an exemplary pixel circuit used in a CMOS imager.

Now referring to the figures, where like reference numbers designate like elements, FIG. 2 shows an exemplary pixel circuit 50 used in a CMOS imager such as the imager 10 illustrated in FIG. 1. The pixel 50 includes a photosensor 52 (e.g., photodiode, photogate, etc.), floating diffusion node N, transfer transistor 54, reset transistor 56, source follower transistor 58 and row select transistor 60. The photosensor 52 is connected to the floating diffusion node N by the transfer transistor 54 when the transfer transistor 54 is activated by a control signal READ. The reset transistor 56 is connected between the floating diffusion node N and an array pixel supply voltage. A reset control signal RESET is used to activate the reset transistor 56, which resets the photosensor 52 and floating diffusion node N as is known in the art.

The source follower transistor 58 has its gate connected to the floating diffusion node N and is connected between the array pixel supply voltage and the row select transistor 60. The source follower transistor 58 converts the stored charge at the floating diffusion node N into an electrical output voltage signal. The row select transistor 60 is controllable by a row select signal for selectively connecting the source follower transistor 58 and its output voltage signal to a column line 62 of a pixel array. It should be appreciated that the illustrated pixel 50 is an example of the type of pixel that may be used with the invention and that the invention is not limited to the type or configuration of the pixel 50.

In operation, the column voltage for the pixel 50 will vary from a reference (i.e., reset) signal voltage (e.g., 2.4 V), which corresponds to a black pixel, to a brightest pixel signal voltage (e.g., approximately 0.6 V). The analog-to-digital converter of the invention must be able to digitize these voltages.

Figure 3:
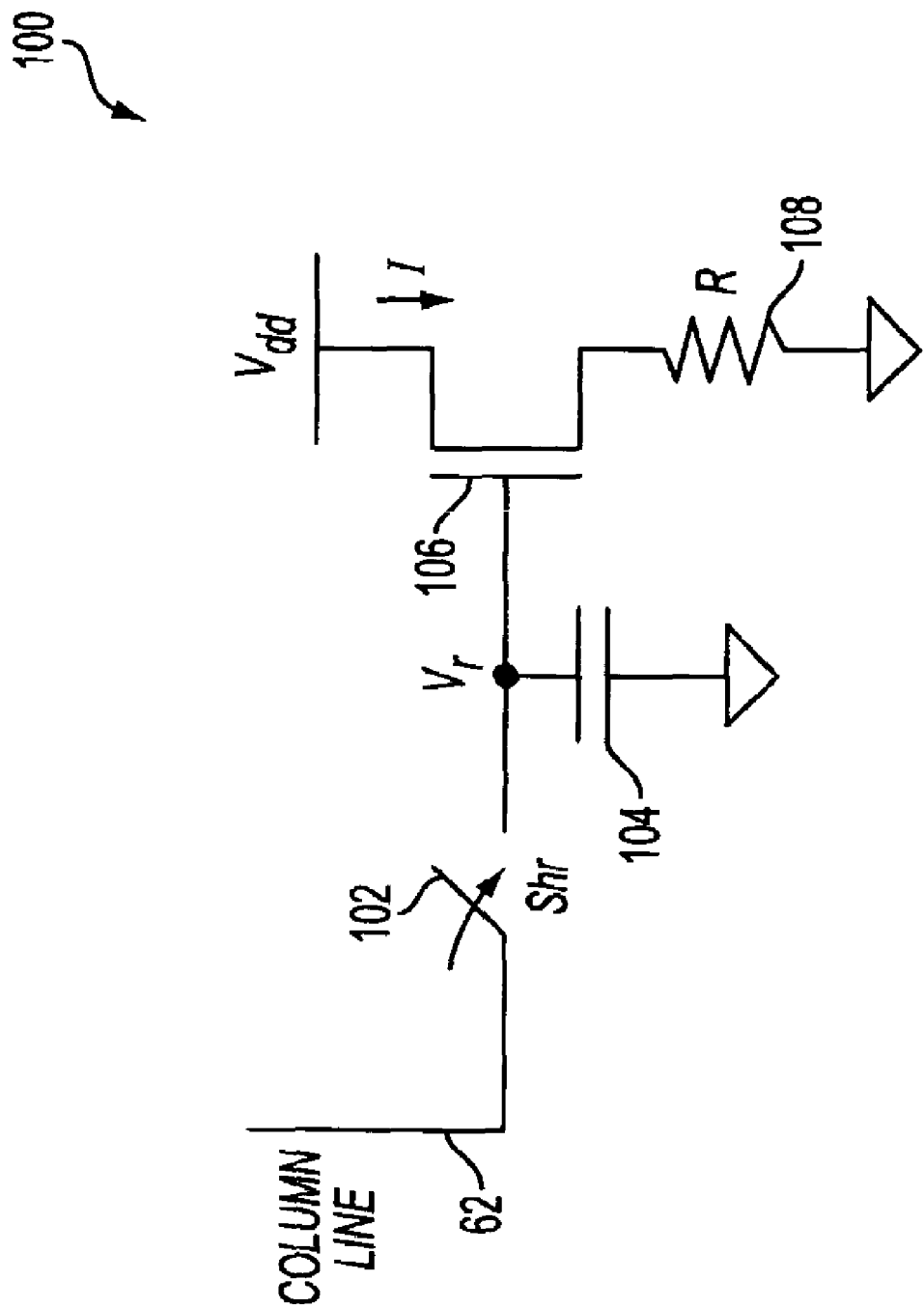
FIG. 3 illustrates an exemplary reference signal sample and hold circuit.

FIG. 3 illustrates an exemplary reference signal sample and hold circuit 100 used to sample and hold the reference signal voltage Vr (i.e., black pixel signal voltage) described above. The circuit 100 includes a sample and hold reference signal (Shr) switch 102, capacitor 104, n-channel MOSFET source follower transistor 106 and a resistor 108. The switch 102 is connected between a column line 62 of a pixel array and the gate of the transistor 106. The capacitor 104 is coupled between a ground potential and the connection between the switch 102 and the transistor 106. The transistor 106 is coupled between a voltage (illustrated as Vdd) and the resistor 108. The resistor 108 is also coupled to a ground potential.

In operation, when it is time to sample and hold the reference signal voltage Vr, the switch 102 is closed so that the reference signal voltage Vr on the column line 62 is connected to the gate of the transistor 106 and the capacitor 104. As a result, a current I flows through the source follower transistor 106. The current I is equal to (Vr−Vthn)/R, where Vthn is the threshold voltage of the transistor 106 and R is the resistance of the resistor 108. Thus, the input voltage Vr is converted to a current I that is proportional to the input voltage Vr. A similar circuit would be required to sample and hold the pixel signal voltage.

Figure 4:
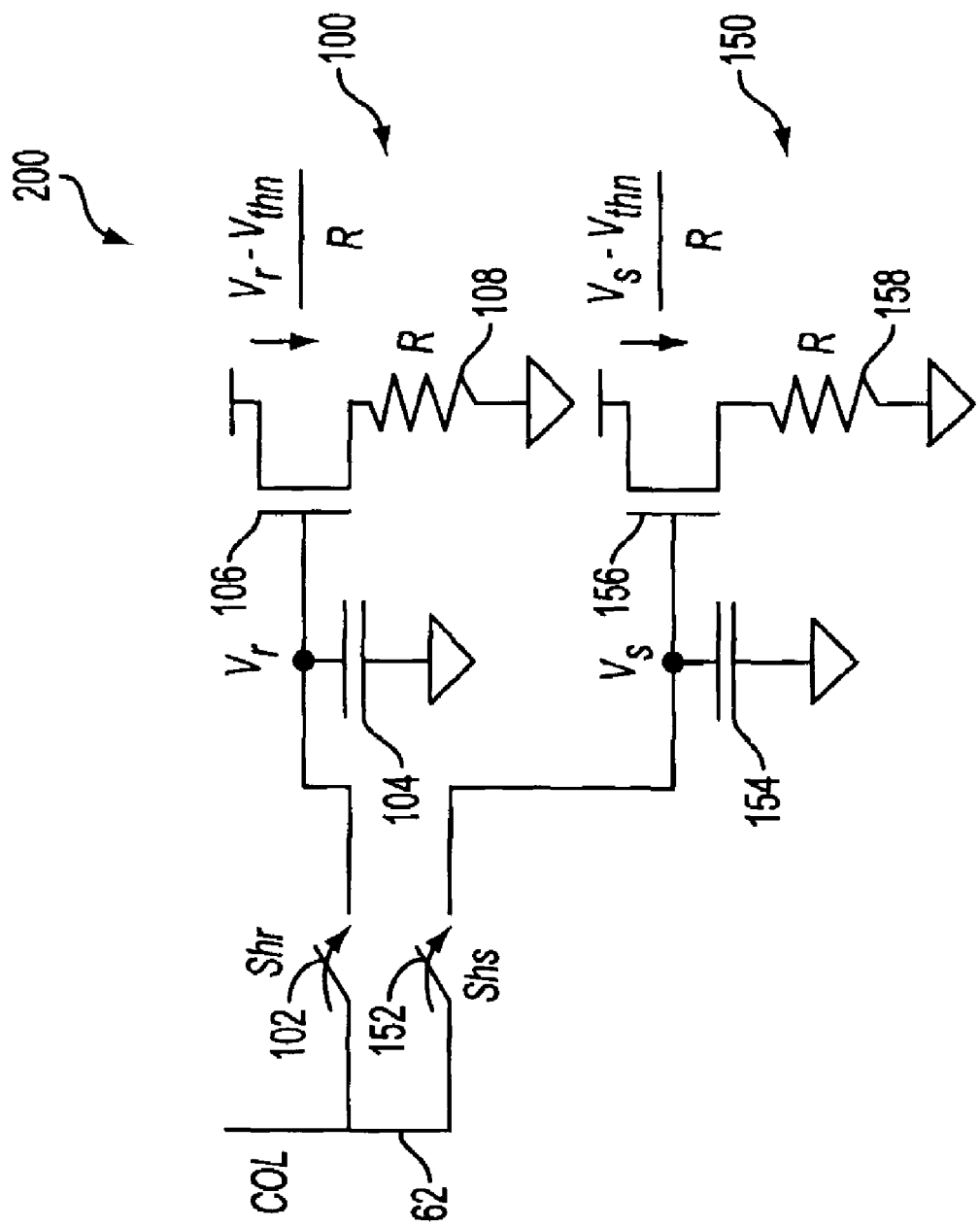
FIG. 4 illustrates an exemplary sample and hold circuit.

FIG. 4 illustrates an exemplary combined sample and hold circuit 200 comprising a reference signal sample and hold circuit 100 and a pixel signal sample and hold circuit 150. The pixel signal sample and hold circuit 150 includes a sample and hold pixel signal (Shs) switch 152, capacitor 154, n-channel MOSFET source follower transistor 156 and a resistor 158. The switch 152 is connected between the column line 62 and the gate of the source follower transistor 156. The capacitor 154 is coupled between a ground potential and the connection between the switch 152 and the transistor 156. The transistor 156 is coupled between a voltage and the resistor 158. The resistor 158 is also coupled to a ground potential.

In operation, when it is time to sample and hold the pixel signal voltage Vs, the switch 152 is closed so that the pixel signal voltage Vs on the column line 62 is connected to the gate of the transistor 156 and the capacitor 154. As a result, a current I flows through the source follower transistor 156 of the circuit 150. The current I is equal to (Vs−Vthn)/R, where Vthn is the threshold voltage of the transistor 156 and R is the resistance of the resistor 158. Thus, the input pixel signal voltage Vs is converted to a current that is proportional to the voltage Vs. The reference signal sample and hold circuit 100 operates as described above to obtain a current that is proportional to the reference signal voltage Vr.

The combined sample and hold circuit 200 uses a double sampling technique to remove noise and mismatch from the associated pixel. Using source follower transistors 106, 156, the circuit 200 achieves very good (i.e., linear) voltage-to-current conversion of the reference and pixel signal voltages Vr, Vs. Linearity, however, is limited by the so-called "body effect" experienced by n-channel transistors that may vary the threshold voltages Vthn of the source follower transistors 106, 156. Thus, it may be desirable to use p-channel MOSFET source follower transistors in the circuits 100, 150 illustrated in FIG. 4.

Figure 5:
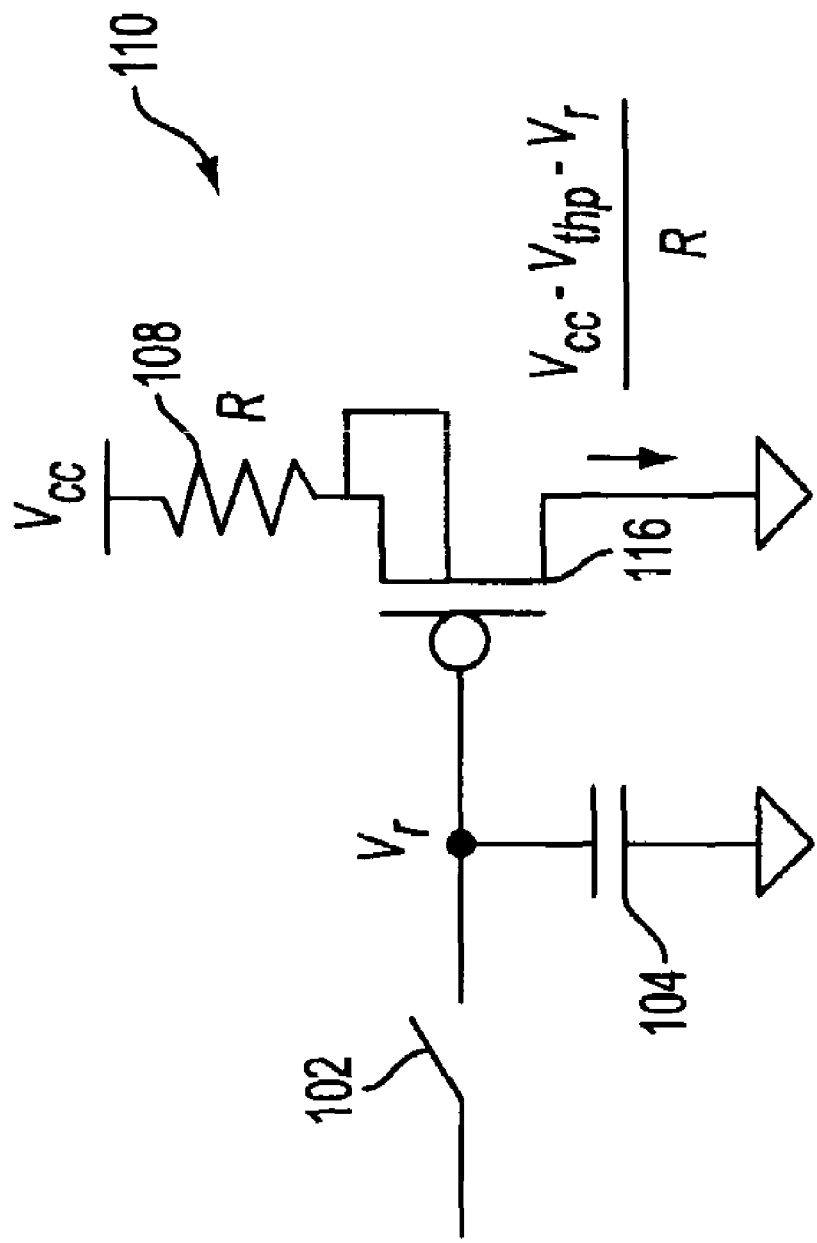
FIG. 5 illustrates another exemplary reference signal sample and hold circuit.

FIG. 5 illustrates another exemplary reference signal sample and hold circuit 110. The circuit 110 includes the sample and hold reference signal (Shr) switch 102, capacitor 104 and resistor 108 described above with reference to FIG. 3. The circuit 110, however, replaces the n-channel MOSFET transistor 106 with p-channel MOSFET transistor 116. P-channel MOSFET transistor 116 is a PMOS transistor formed in its own well. The switch 102 is connected between the column line 62 and the gate of the transistor 116. The capacitor 104 is coupled between a ground potential and the connection between the switch 102 and the transistor 116. The transistor 116 is coupled between the resistor 108 and the ground potential. The resistor 108 is also coupled to a voltage source (illustrated as Vcc).

In operation, when it is time to sample and hold the reference signal voltage Vr, the switch 102 is closed so that the reference signal voltage Vr on the column line 62 is connected to the gate of the transistor 116 and the capacitor 104. As a result, a current flows through the p-channel MOSFET source follower transistor 116. With the illustrated configuration, the current is equal to (Vcc−Vthp−Vr)/R, where Vthp is the threshold voltage of the transistor 116 and R is the resistance of the resistor 108. This means that Vcc−Vr must be greater than Vthp. If, for example, Vcc is equal to 3 V and Vr is equal to 2.4 V (i.e., black pixel signal), then Vthp must be less than 0.6 V. Using the circuit 110 illustrated in FIG. 5, however, may require shifting the voltage range between the black pixel signal and the brightest pixel signal to 2.2 V to 0.4 V (from 2.4 V to 0.6 V).

Realistically, the manufacturing variability of resistor sheet resistance, threshold voltages and capacitances present design challenges with respect to ensuring the operation of the imager device. To overcome some of these challenges, it is desirable to replace the resistors 108, 158 (FIG. 4) of the sample and hold circuit 200 (FIG. 4) with switched capacitor resistors.

Figure 6:
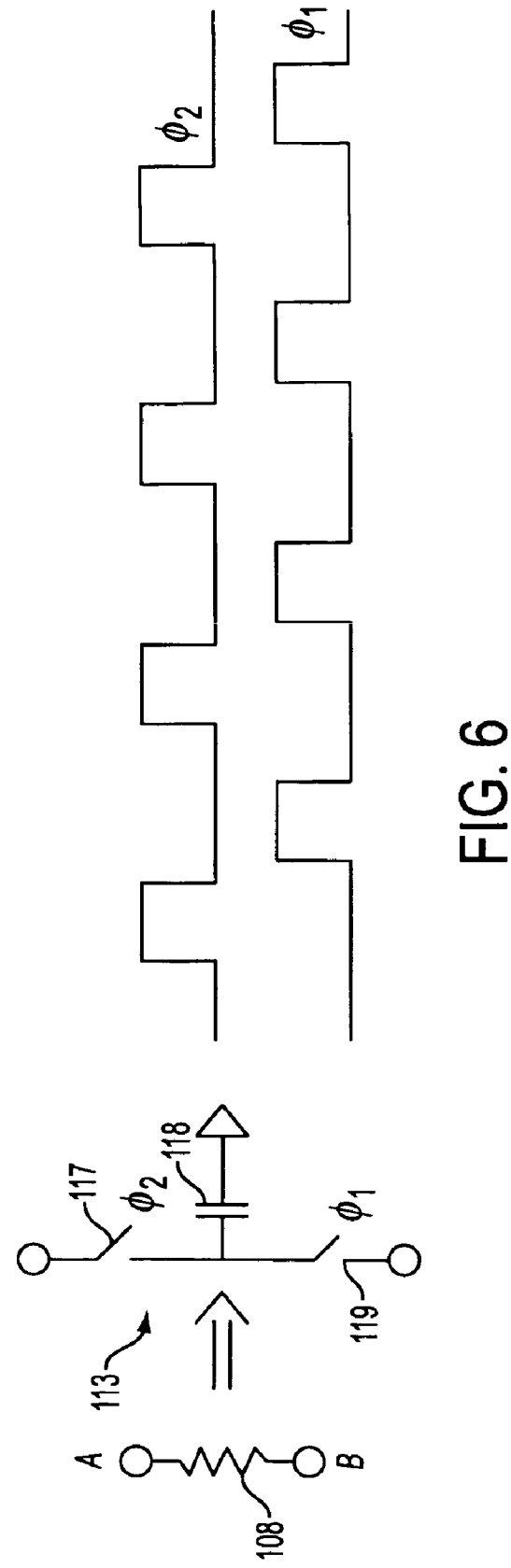
FIG. 6 illustrates a switched capacitor resistor and a timing diagram for the clock signals used to control the resistor.

FIG. 6 illustrates a switched capacitor resistor 113 and a timing diagram for the clock signals $\Phi_1$, $\Phi_2$ used to control the resistance Rsc of the resistor 113. The switched capacitor resistor 113 comprises a first switch 119 controlled by the first clock signal $\Phi_1$ and a second switch 117 controlled by a second clock signal $\Phi_2$. A capacitor 118 is coupled between a connection of the switches 117, 119 and a ground potential. The clock signals $\Phi_1$, $\Phi_2$ are non-overlapping clock signals that may be generated by any clock signal generator, control circuit or even the image processor if so desired.

Closing the first switch 119 (and opening the second switch 117) may charge or discharge the capacitor 118 depending upon what the switches 117, 119 are connected to. Similarly, closing the second switch 117 (and opening the first switch 119) may charge or discharge the capacitor 118. Using the non-overlapping clock signals $\Phi_1$, $\Phi_2$ to open and close the switches 119, 117 will cause the capacitor 118 to simulate a resistor (e.g., resistor 108). The resistance Rsc of the resistor 113 is equal to 1/f·C, where C is the capacitance of the capacitor 118 and f is the frequency of the clock signals $\Phi_1$, $\Phi_2$. By varying the frequency f, the resistance Rsc of the resistor 113 may be adjusted as desired. The larger the frequency f, the smaller the resistance Rsc of the resistor 113.

Figure 7:
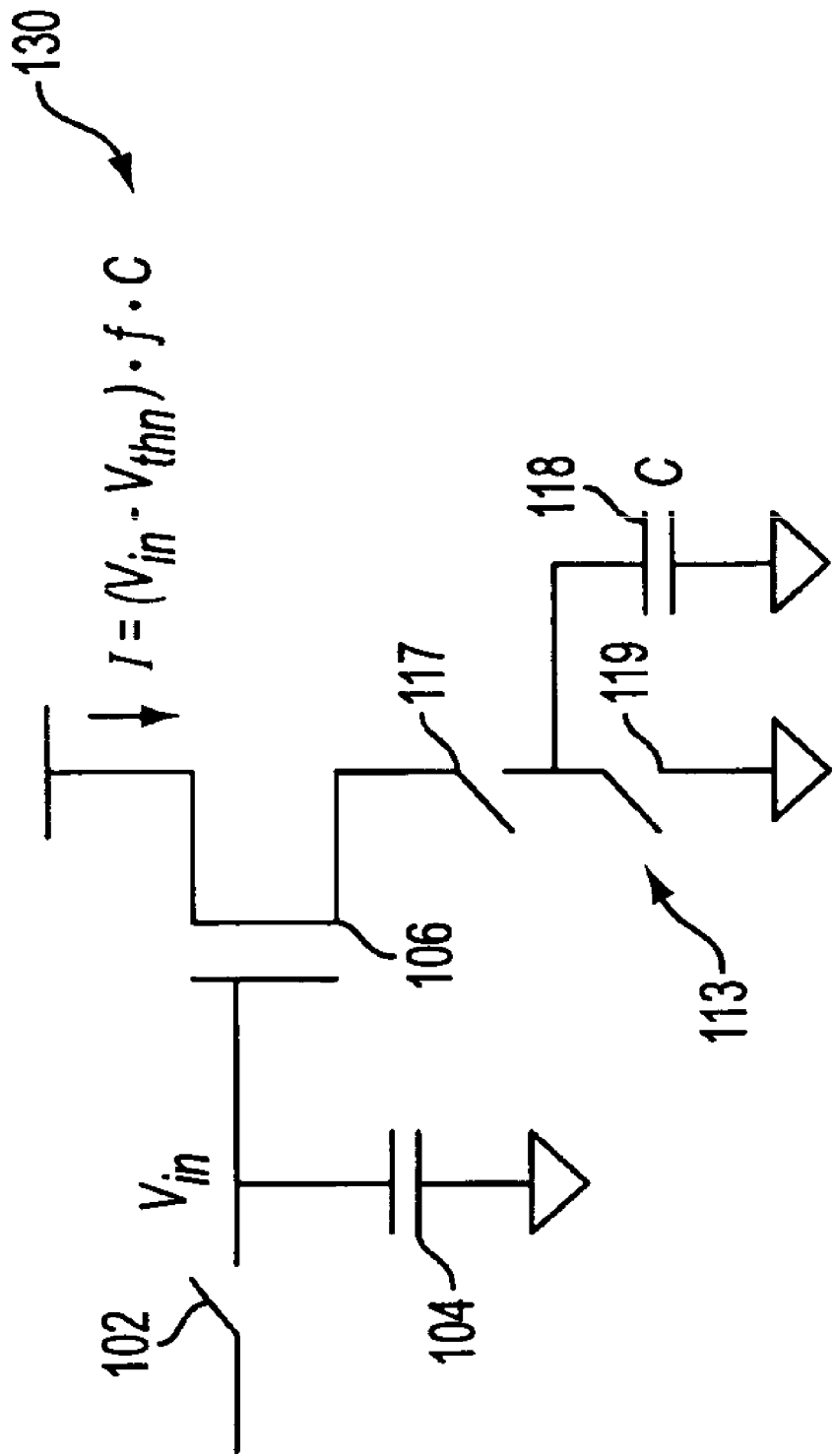
FIG. 7 illustrates an exemplary sample and hold circuit utilizing a switched capacitor resistor illustrated in FIG. 6.

FIG. 7 illustrates an exemplary sample and hold circuit 130 utilizing the switched capacitor resistor 113 illustrated in FIG. 6. The switched capacitor resistor 113 is coupled between a source follower transistor 106 and the ground potential; otherwise, the circuit 130 is essentially the same as the sample and hold circuits 100, 150 illustrated in FIG. 4.

In operation, when it is time to sample and hold the input voltage Vin, the switch 102 is closed so that the input voltage Vin is connected to the gate of the transistor 106 and the capacitor 104. As a result, a current I flows through the source follower transistor 106. The current I is equal to (Vin−Vthn)·f·C, where Vthn is the threshold voltage of the transistor 106, C is the capacitance of the capacitor 118 and f is the frequency of the clock signals $\Phi_1$, $\Phi_2$ (not shown) used to control the switches 119, 117. Thus, the input voltage Vin is converted to a current I that is proportional to the input voltage Vin.

The circuit 130 can be used to replace the sample and hold circuits 100, 150 (FIG. 4) for the reference and pixel signals. It is worth noting that during operation of the circuit 130, once the current I flows to the switched capacitor resistor 113 additional current flow through the transistor 106 is no longer required. Therefore, in actuality, the current I is an average current. There is no quiescent DC (direct current) current burn in the circuit 130. This allows testing of the circuit 130 in any manner desired (e.g., test low, fast, etc.) because there is no need to draw power from the power supply once the current I flows into the switched capacitor resistor 113. This is a major benefit of the circuit 130. Another major benefit of the configuration of the circuit 130 is that the circuit's 130 characteristics can be modified merely by changing the frequency f of the clock signals $\Phi_1$, $\Phi_2$ (not shown) used to control the switches 119, 117.

Figure 8:
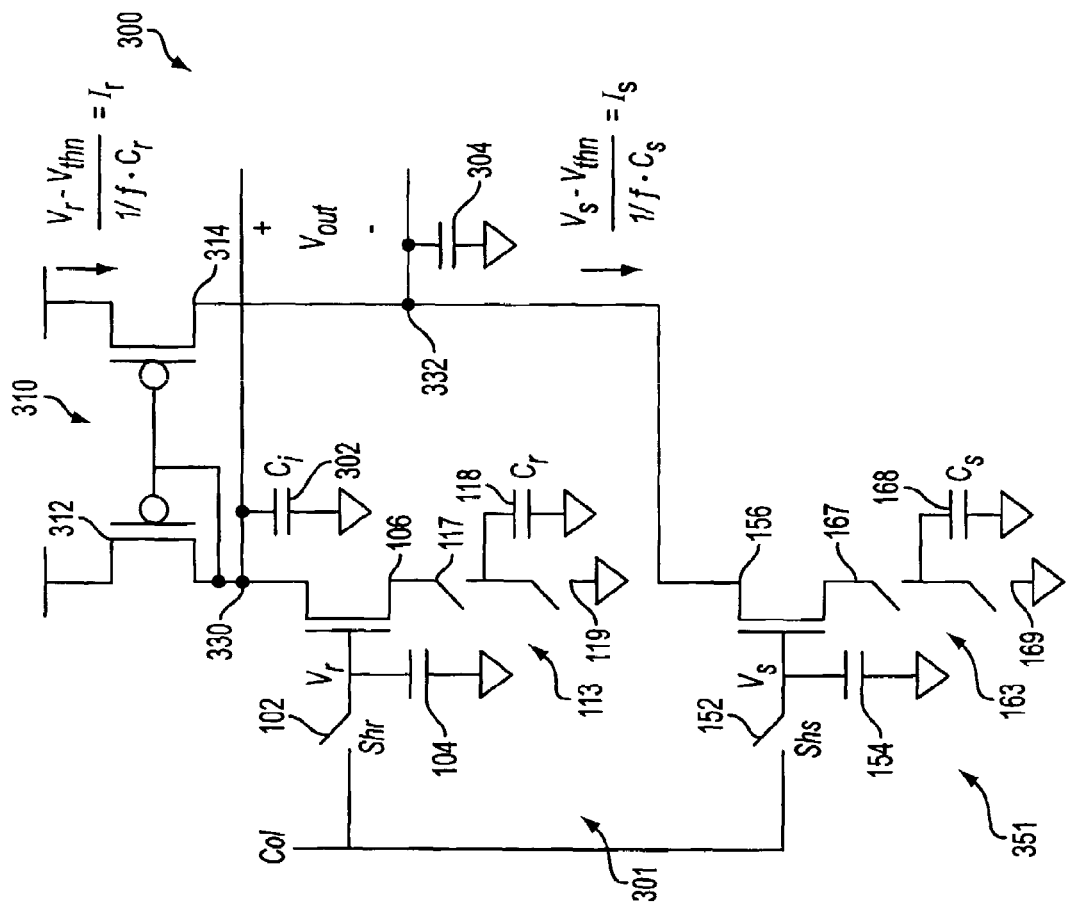
FIG. 8 illustrates another exemplary sample and hold circuit.

FIG. 8 illustrates another exemplary combined sample and hold circuit 300. The circuit 300 includes a reference signal sample and hold circuit 301 and a pixel signal sample and hold circuit 351. Each circuit 301, 351 utilizes respective switched capacitor resistors 113, 163 and is constructed in accordance with the circuit 130 illustrated in FIG. 7. That is, the reference signal sample and hold circuit 301 includes a sample and hold reference signal (Shr) switch 102, capacitor 104, n-channel MOSFET source follower transistor 106 and the switched capacitor resistor 113. The switched capacitor resistor 113 includes a first switch 119 controlled by the first clock signal $\Phi_1$, second switch 117 controlled by the second clock signal $\Phi_2$ and capacitor 118 (Cr). The current Ir flowing through the reference signal sample and hold circuit 301 is equal to (Vr−Vthn)/(1/f·Cr) or (Vr−Vthn)·f·Cr, where Vthn is the threshold voltage of the transistor 106, Cr is the capacitance of the capacitor 118 and f is the frequency of the non-overlapping clock signals $\Phi_1$, $\Phi_2$ (not shown) used to control the switches 119, 117.

The pixel signal sample and hold circuit 351 includes a sample and hold pixel signal (Shs) switch 152, capacitor 154, n-channel MOSFET source follower transistor 156 and the switched capacitor resistor 163. The switched capacitor resistor 163 includes a first switch 169 controlled by the first clock signal $\Phi_1$, second switch 167 controlled by the second clock signal $\Phi_2$ and capacitor 168 (Cs). The current Is flowing through the pixel signal sample and hold circuit 351 is equal to (Vs−Vthn)/(1/f·Cs) or (Vs−Vthn)·f·Cs, where Vthn is the threshold voltage of the transistor 156, Cs is the capacitance of the capacitor 168 and f is the frequency of the non-overlapping clock signals $\Phi_1$, $\Phi_2$ (not shown) used to control the switches 169, 167.

The illustrated combined sample and hold circuit 300 also includes a current mirror 310 and two additional capacitors 302, 304. The current mirror 310 includes two p-channel MOSFET transistors 312, 314. The first transistor 312 of the mirror 310 is coupled between a voltage source and a first node 330 that is coupled to the first additional capacitor 302 and a terminal of the transistor 106 of the reference signal sample and hold circuit 301. The second transistor 314 of the mirror 310 is coupled between the voltage source and a second node 332 that is coupled to the second additional capacitor 304 and a terminal of the transistor 156 of the pixel signal sample and hold circuit 351. The gate terminals of the two p-channel MOSFET transistors 312, 314 are connected to each other and to the first node 330.

The two additional capacitors 302, 304 are used to smooth out the currents flowing through the circuit 300. It should be appreciated that these capacitors 302, 304 are not required even though they enhance the operation of the circuit 300 by integrating the currents flowing through the circuit 300.

The combined sample and hold circuit 300 operates as follows. Using the principle that if the pixel signal voltage Vs represents a black pixel, then the pixel signal voltage Vs is equal to the reference signal voltage Vr because, as explained above, the reference signal voltage Vr represents a black pixel. This means that the reference signal current Ir is equal to the pixel signal current Is when the pixel signal voltage Vs represents a black pixel. The output Vout of the circuit 300 is determined by the voltages at nodes 320 and 322. Thus, if Vs=Vr (and Is=Ir), then the output Vout should be zero.

In operation, the reference signal current Is, present at node 330, is mirrored by the current mirror 310. Using the above principle, differences in the two currents Ir, Is can be used to determine the value of the pixel signal (represented by the output Vout). Thus, the circuit 300 attempts to balance the reference signal current Ir with the pixel signal current Is. In doing so, the current mirror 310 effectively subtracts the two currents Ir, Is during the operation of the circuit 300. As noted above, when the pixel signal represents a black pixel, the two currents Ir, Is should be equal and the output Vout should be zero.

Reality, however, dictates that the reference signal current Ir will always be larger than the pixel signal current Is. This occurs because the pixel signal portion of the circuit 300 cannot sink enough current to keep up with the reference signal portion. This means that the output Vout will be pulled up to a voltage that will not be equal to zero even if the pixel is black. As such, one of the sample and hold circuits 301, 351 must be modified to ensure that Ir=Is when the pixel is black. Since the reference signal current Ir will always be greater than the pixel signal current Is, it is desirable to modify the reference signal sample and hold circuit 301.

As noted above, the reference signal current Ir equals $(Vr-Vthn) \cdot f \cdot Cr$ and the pixel signal current Is equals $(Vs-Vthn) \cdot f \cdot Cs$, where Vthn is the threshold voltage of the transistors 106, 156, Cr is the capacitance of the capacitor 118, Cs is the capacitance of the capacitor 168 and f is the frequency of the non-overlapping clock signals $\Phi_1$, $\Phi_2$ (not shown) used to control the switches 119, 169, 117, 167. Looking at these two equations, the circuit 301 could be modified to ensure that Ir=Is when the pixel is black by trying to adjust the capacitance Cr of the capacitor 118, but this option is impracticable and not desirable. In addition, it is more desirable to have the capacitances Cr, Cs of the capacitors 118, 168 to be equal to each other and to have another mechanism for equating the currents Ir, Is.

Another mechanism for modifying the circuit 301 is to change the frequency f of the non-overlapping clock signals $\Phi_1$, $\Phi_2$. As noted above, changing the frequency f of the clock signals $\Phi_1$, $\Phi_2$ is one way to change the characteristics (i.e., resistance Rsc) of the sample and hold circuitry 301. This is an efficient and simple way to modify the current Ir that does not rely on precision circuitry.

Figure 9:
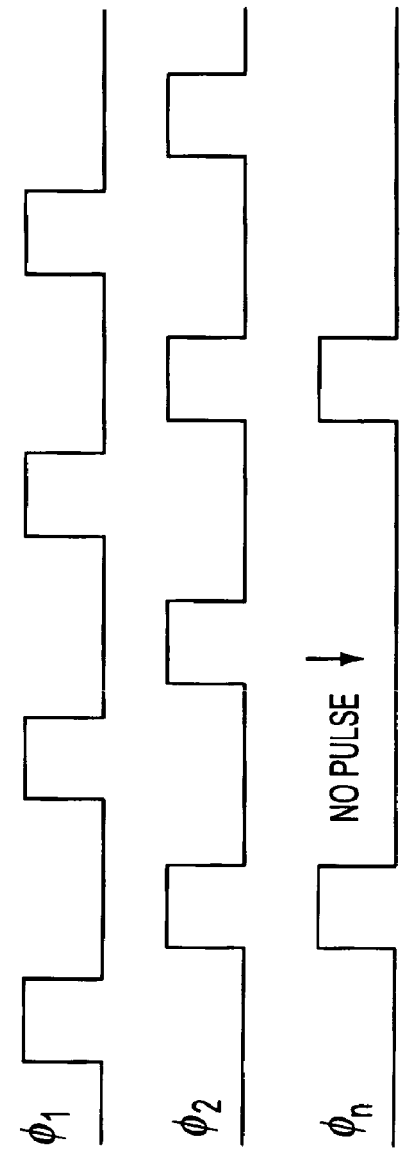
FIG. 9 illustrates a switched capacitor resistor constructed in accordance with an embodiment of the invention.
Figure 9:
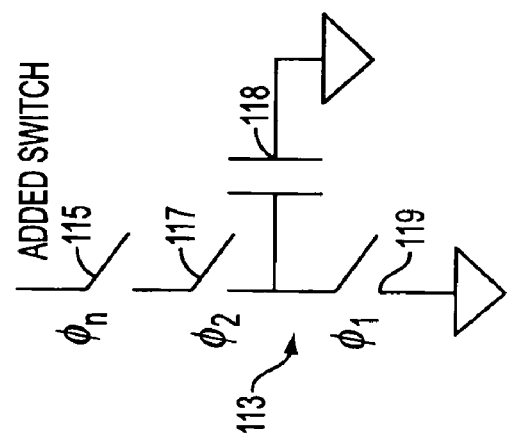

It is desirable, however, to use the same frequency f of the clock signals $\Phi_1$, $\Phi_2$ throughout the circuit 300. Therefore, the circuit 301 requires a mechanism for modifying its characteristics (specifically, its resistance) based on frequency, but without changing the frequency f of the clock signals $\Phi_1$, $\Phi_2$. One way to do so, is to disconnect one of the switches 119, 117 without disturbing the operation of, or modifying the frequency f of, the clock signals $\Phi_1$, $\Phi_2$. FIG. 9 illustrates this technique. In FIG. 9, the switched capacitor resistor 113 used in the reference signal sample and hold circuit 301 (FIG. 8) is connected in series with a switch 115 that is not driven by either one of the clock signals $\Phi_1$, $\Phi_2$. Instead, the additional switch 115 is driven by a third clock signal $\Phi_n$.

The additional switch 115 is used to change the resistance of the switched capacitor resistor 113 (when needed) without changing the frequency f of the clock signals $\Phi_1$, $\Phi_2$. When it is desired to have switch 117 closed and part of the resistor 113 or its connecting circuitry, clock signals $\Phi_2$, $\Phi_n$ must be generated as illustrated and applied to the switches 117, 115. When it is desired to have switch 117 removed from the resistor 113 or its connecting circuitry, instead of changing its associated clock signal $\Phi_2$, the clock signal $\Phi_n$ associated with the additional switch 115 is not pulsed, which leaves the additional switch 115 open and the second switch 117 out of the resistor 113 and connected circuitry, which changes the resistance of the resistor 113. The resistance of the resistor 113 equals $1/((M/N) \cdot f \cdot C)$, where N is the number of times the second switch 117 closes (due to the second clock signal $\Phi_2$), M is the number of times the added switch 115 closes (due to the third clock signal $\Phi_n$), C is the capacitance of the capacitor 118 and f is the frequency of the clock signals $\Phi_1$, $\Phi_2$.

Figure 10:
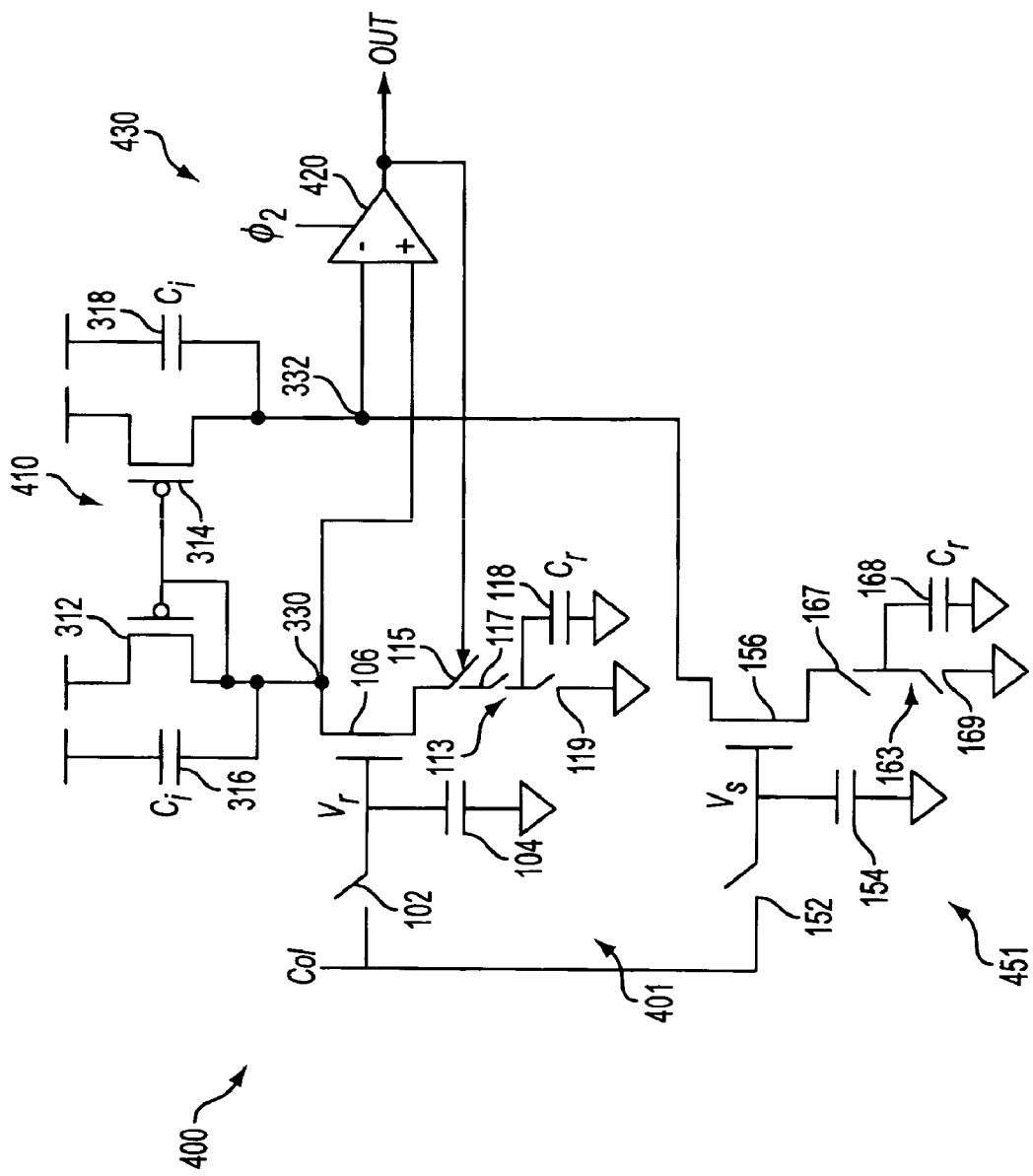
FIG. 10 illustrates an exemplary sample and hold circuit and one bit analog-to-digital converter constructed in accordance with an embodiment of the invention.

Thus, incorporating the additional switch 115 and its associated clock signal $\Phi_n$ into the circuit 301 (FIG. 8) allows the combined sample and hold circuit 300 to match the reference and pixel signal currents Ir, Is without modifying the frequency of the clock signals $\Phi_1$, $\Phi_2$. FIG. 10 illustrates an exemplary sample and hold circuit 400 constructed in accordance with an embodiment of the invention. The circuit 400 utilizes the principles discussed with respect to FIG. 9 and also includes a simple analog-to-digital converter 430 that takes advantages of the same principles.

The circuit 400 includes a reference signal sample and hold circuit 401, pixel signal sample and hold circuit 451, current mirror 410 and analog-to-digital converter circuitry 430. The analog-to-digital converter circuitry 430 includes a comparator 420 and the additional switch 115 (discussed above with reference to FIG. 9). The pixel signal sample and hold circuit 451 utilizes a switched capacitor resistor 163 and is constructed in accordance with the circuit 351 illustrated in FIG. 8. The reference signal sample and hold circuit 401 includes a switched capacitor resistor 113 connected in series with the additional switch 115. It is desirable that the capacitors 118, 168 in the switched capacitor resistors 113, 163 have the same capacitance Cr.

The comparator 420 has a first input connected to the first node 330 and a second input connected to the second node 332. The output OUT of the comparator 420 is used to control the additional switch 115. Thus, the output OUT is used as the third clock signal $\Phi_n$ (FIG. 9). The comparator 420 is clocked by the second clock signal $\Phi_2$ so that when it is desirable to close the additional switch 115, the third clock signal $\Phi_n$ (output OUT) is pulsed high at substantially the same time the second clock signal $\Phi_2$ is pulsed high and closing the second switch 117. This ensures that both the second and third switches 117, 115 are closed at the same time when desired.

As is described below in more detail, the output OUT of the comparator 420 also represents the pixel signal voltage Vs. Thus, the output OUT of the comparator 420 is a digital representation of the analog pixel signal voltage Vs.

The remainder of the circuit 400 is essentially the same as the circuit 300 discussed above with respect to FIG. 8. That is, the current mirror 410 includes two p-channel MOSFET transistors 312, 314. The first transistor 312 of the mirror 410 is coupled between a voltage source and the first node 330 that is coupled to the first additional capacitor 316 and a terminal of the transistor 106 of the reference signal sample and hold circuit 401. The second transistor 314 of the mirror 410 is coupled between the voltage source and a second node 332 that is coupled to the second additional capacitor 318 and a terminal of the transistor 156 of the pixel signal sample and hold circuit 451. The gate terminals of the two p-channel MOSFET transistors 312, 314 are connected to each other and to the first node 330.

The two additional capacitors 316, 318 are used to smooth out the currents flowing through the circuit 400. It should be appreciated that these capacitors 316, 318 are not required even though they enhance the operation of the circuit 400 by integrating the currents flowing through the circuit 400. The voltage source connected to the capacitors 316, 318 and the current mirror 410 may be a power supply voltage (e.g., Vcc) used to supply power to the circuit 400 or an array pixel voltage.

In operation, the circuit 400 attempts to keep the same amount of current flowing through the reference signal circuit 401 and the pixel signal circuit 451. This would result in the same voltage being present at the two nodes 330, 332. To try to keep the same amount of current flowing through the circuits 401, 451, the comparator 420 is used to control the resistance of the reference signal sample and hold circuit 401.

If the comparator 420 detects that the pixel signal voltage Vs equals the reference signal voltage Vr (via the corresponding currents), then the comparator output OUT is a value (e.g., logical one) that closes the additional switch 115 so that the second switch 117 is included within the resistor 113 circuitry. The comparator 420 continues to output the logical one at the frequency of the second clock signal $\Phi_2$. Therefore, if the pixel signal voltage Vs equals the reference signal voltage Vr, which indicates a black pixel, then the output OUT from the comparator 420 will always be logical one (at the frequency of the second clock signal $\Phi_2$).

If the comparator 420 detects that the pixel signal voltage Vs does not equal the reference signal voltage Vr (via the corresponding currents), then the comparator output OUT is a value (e.g., logical zero) that opens the additional switch 115 so that the second switch 117 is disconnected from the resistor 113 and its connecting circuitry. This prevents current from flowing through the transistor 106 of the reference signal sample and hold circuit 401. The comparator 420 outputs the logical zero at the frequency of the second clock signal $\Phi_2$ until the currents are substantially equal.

If, for example, the pixel signal voltage Vs corresponds to the brightest signal possible (e.g., 0.6 V), then the output OUT from the comparator 420 will always be a logical zero (at the frequency of the second clock signal $\Phi_2$). If, for example, the pixel signal voltage Vs corresponds to a brightness between the black and brightest signals, then the output OUT from the comparator 420 will be a mix of logical ones and zeros (at the frequency of the second clock signal $\Phi_2$). Thus, the duty cycle of the comparator output OUT represents the pixel signal voltage Vs. Thus, the circuit 400 generates a digital representation of the analog pixel signal voltage Vs without the use of a reference voltage source and/or digital-to-analog converter typically required in conventional analog-to-digital converters.

A simple formula for the above operation is as follows. If Vr≧Vs, then (Vr−Vthn)·(M/N)·f·Cr=(Vs−Vthn)·f·Cr, where Vthn is the threshold values of the transistors 106, 156, Cr is the capacitance of the capacitors 118, 168, f is the frequency of the clock signals $\Phi_1$, $\Phi_2$, N is the total number of time the circuitry is clocked and M is the number of times the additional switch 115 was added to the circuit 401 (via the output OUT). As can be seen, if Vs equals Vr, then M must equal N, which means that the additional switch 115 is always added. For the general case, $$(Vs-Vthn)/(Vr-Vthn)=M/N. \quad (1)$$

Figure 11:
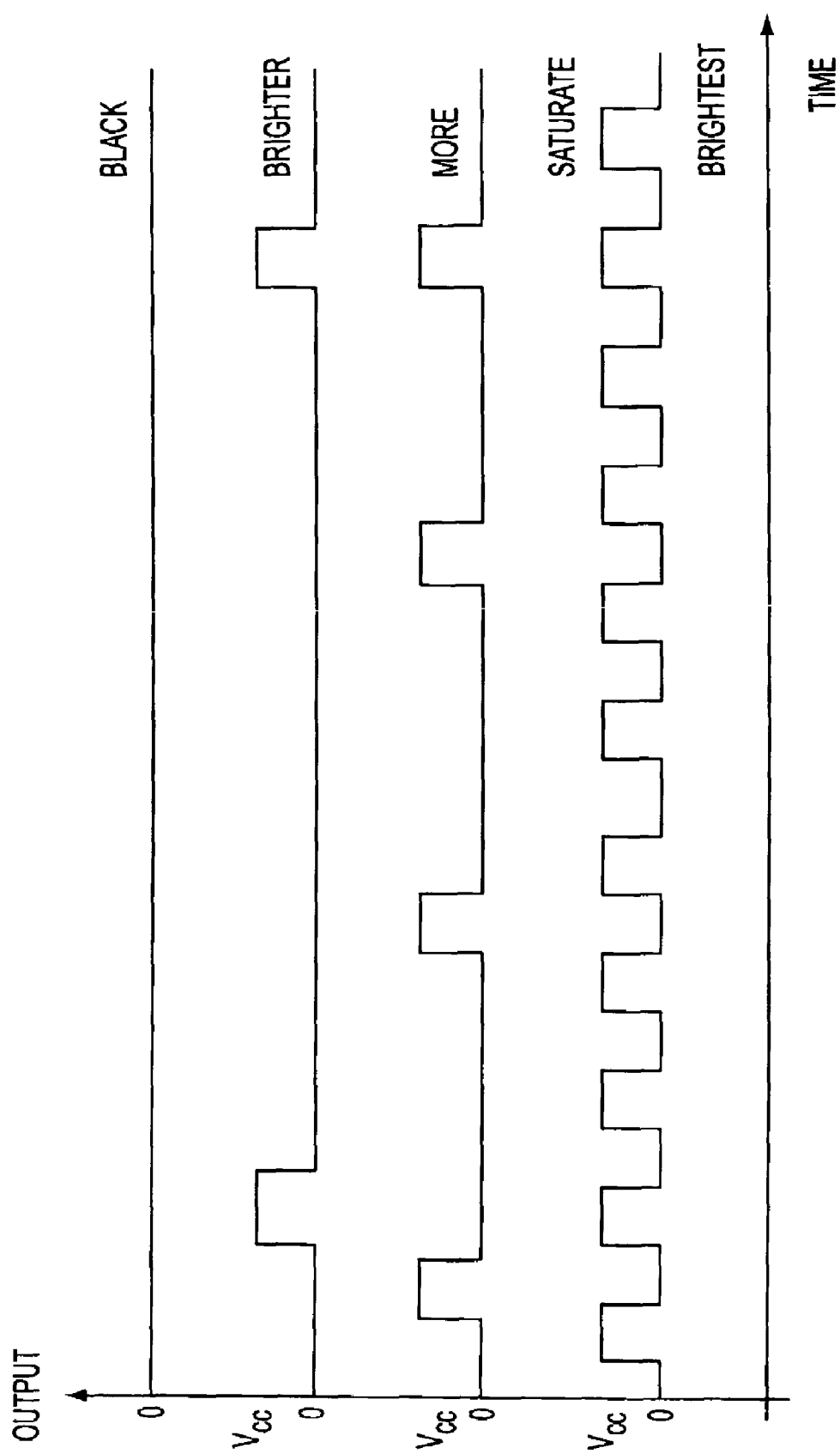
FIG. 11 is a timing diagram of the signals output from the circuit illustrated in FIG. 10.

If Vs does not equal Vr, then M will not equal N. Using an inverted output OUT, if Vr equals Vs, the pixel is black, and the output of the circuit 400 stays low. It should be appreciated that the inversion is not required to practice the invention. It is desirable, however, to have a low output represent a dark pixel. Some observations about equation (1) reveal that frequency f and capacitance Cr are no longer part of the equation. As the pixel signal gets brighter (i.e., Vs decreases) the inverted output goes high more often. This is reflected in FIG. 11, which is an exemplary timing diagram of the inverted output OUT of the circuit 400 (FIG. 10) for different pixel signals. It should be noted that if gain is desired, a factor k can be added to equation 1, so that Cr equals kCr$_2$ (i.e., use different capacitors 118, 168).

The following examples are provided to understand the principles of the invention. N, which is the total number of times the circuitry 400 is clocked, may be computed as follows. If the frequency f is 50 Mhz and row readout time is 20 µs, then the period is 1/f=20 ns. N=20 µs/20 ns=1000. It should be understood that increasing the frequency f increases N. This can be implemented rather easily since settling time is not important. The lone drawback is that as the frequency increases, so will the power consumption. The resolution of the analog-to-digital converter circuitry is computed as follows. If Vrmax−Vsmin=2.4−0.6=1.8, which is the greatest possible difference between the black and brightest pixel signals, and N=1000, Vresolution−1.8 (1/1000) =1.8 mV.

Figure 12:
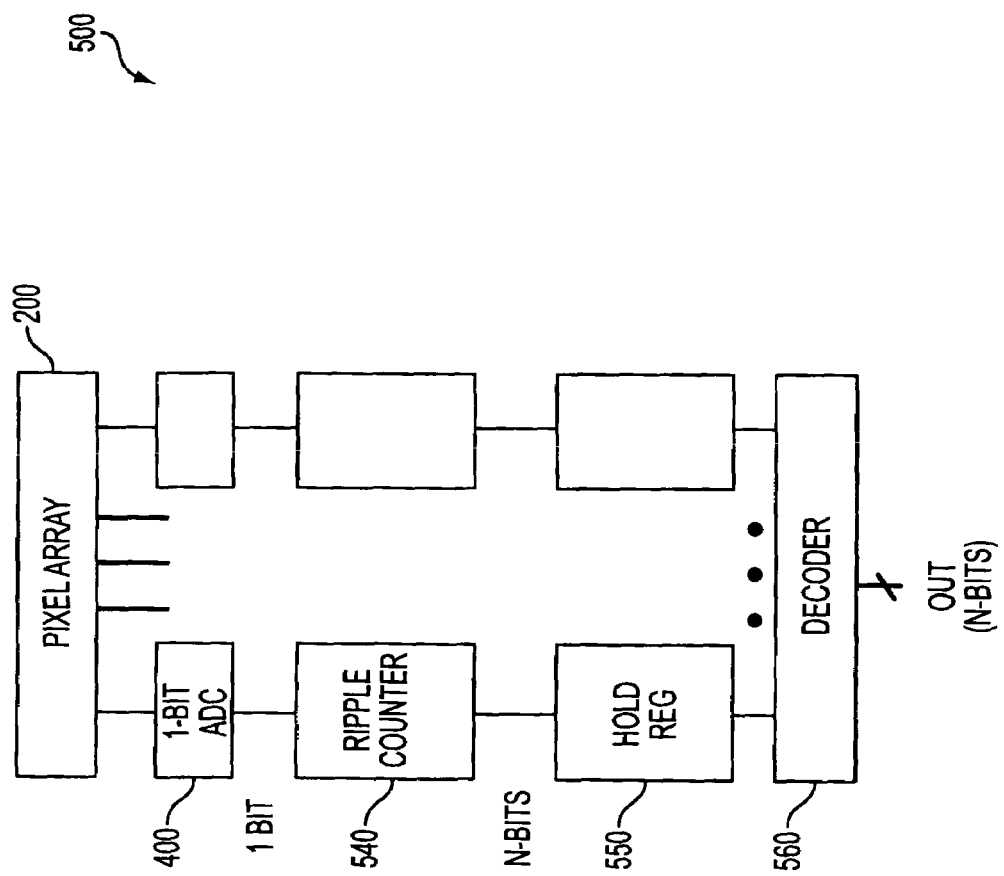
FIG. 12 is a portion of an exemplary imager constructed in accordance with an embodiment of the invention.

FIG. 12 is a portion of an exemplary imager 500 constructed in accordance with an embodiment of the invention. The imager 500 includes a pixel array 200 having its column outputs connected to a plurality of circuits 400 containing the novel one-bit analog-to-digital circuitry 430 (FIG. 10). The one-bit output of the circuit 400 is connected to a counter 540, which in a preferred embodiment is a ripple counter. A ripple counter is preferred since it helps further reduced the amount of power used in the imager 500. The counter 540 gathers the one-bit data output from the circuit 400 and outputs N-bits of data to the hold register 550. When the next row of information is being read and output by the circuit 400, the hold register 550 outputs its data to the decoder 560, which outputs N-bits of digital pixel data representative of the analog pixel signals that were sampled, held and converted in the circuit 400. It is desired that the data is read out a row at a time.

Power consumption for the invention may be estimated as follows. For each column in the array 200, the circuitry 400 operates at <10 µA at 50 Mhz. The ripple counter 540 (e.g., 12-bit ripple counter) operates at <10 µA. For e.g., 1000 columns, the total current draw is <20 mA. If Vcc is 3 V, then total power is <60 mW.

Thus, the invention utilizes no reference voltages, buffers, and/or digital-to-analog converters. The design time of the circuitry of the invention will be greatly reduced by eliminating precision elements from the design. A simpler fabrication process may be used since the capacitors do not have to be poly/poly capacitors. Total power for the imager chip 500 should be well under 10 mW if Vcc is 3 V. The circuitry of the invention will experience low noise.

Figure 13:
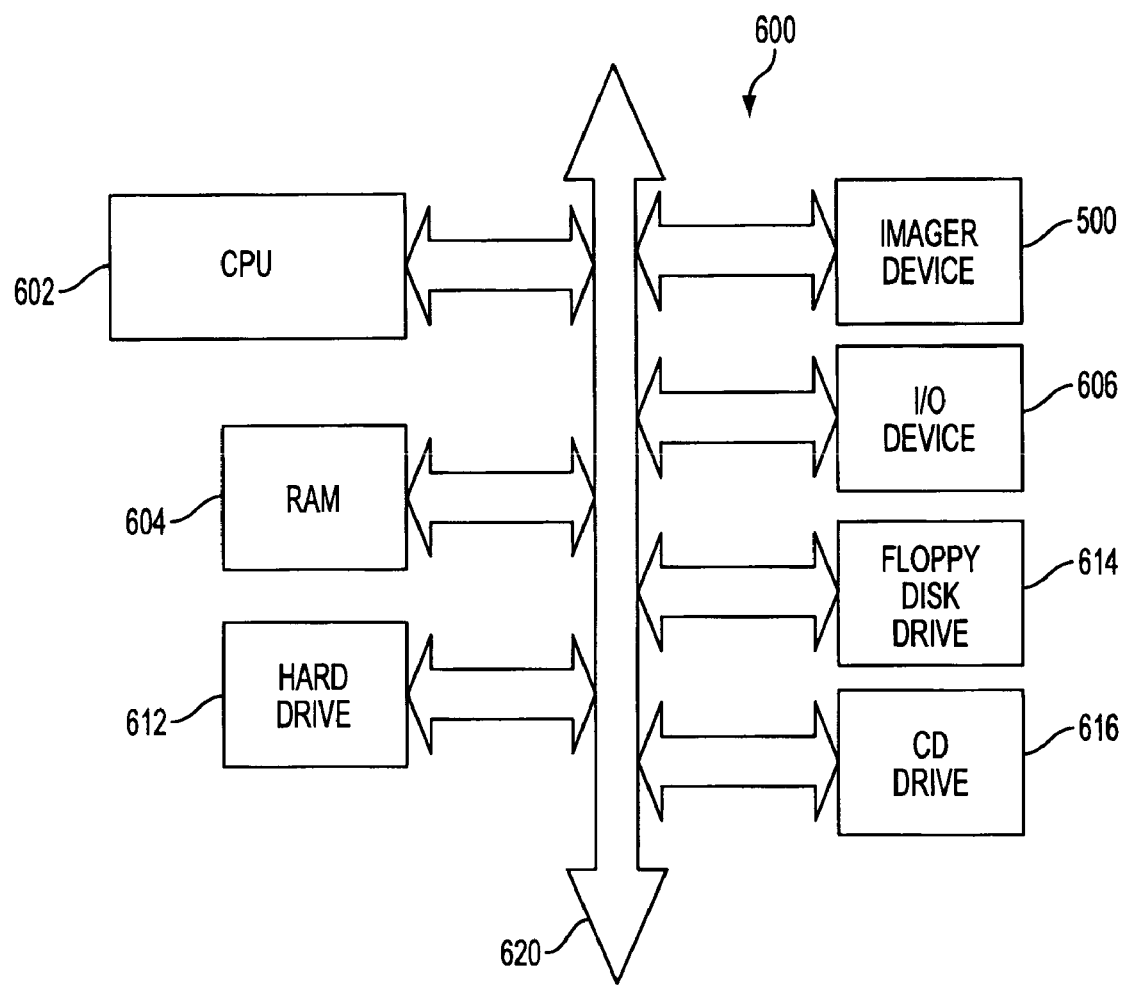
FIG. 13 shows a processor system incorporating at least one imager device constructed in accordance with an embodiment of the invention.

FIG. 13 shows system 600, a typical processor based system modified to include an imager device 500 (FIG. 12). Examples of processor based systems, which may employ the imager device 500, include, without limitation, computer systems, camera systems, scanners, machine vision systems, vehicle navigation systems, video telephones, surveillance systems, auto focus systems, star tracker systems, motion detection systems, image stabilization systems, and others.

System 600 includes a central processing unit (CPU) 602 that communicates with various devices over a bus 620. Some of the devices connected to the bus 620 provide communication into and out of the system 600, illustratively including an input/output (I/O) device 606 and imager device 500. Other devices connected to the bus 620 provide memory, illustratively including a random access memory (RAM) 604, hard drive 612, and one or more peripheral memory devices such as a floppy disk drive 614 and compact disk (CD) drive 616. The imager device 500 may be combined with a processor, such as a CPU, digital signal processor, or microprocessor, in a single integrated circuit. The imager device 500 may be a CCD imager or CMOS imager constructed in accordance with any of the illustrated embodiments.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Any modification, though presently unforeseeable, of the present invention that comes within the spirit and scope of the following claims should be considered part of the present invention.

What is claimed as new and desired to be protected by Letters Patent of the United States is:

1. An imager device, comprising:
   an array of pixels; and
   a first circuit electrically coupled to at least one pixel of said array, said first circuit being adapted to output a digital representation of an analog pixel signal based on a difference between a reference signal current and pixel signal current, said first circuit for calibrating the reference signal current only when the reference and pixel signal currents are not equal.

2. The imager device of claim 1, wherein said first circuit comprises:
   a second circuit having a first resistance through which the reference signal current flows;
   a third circuit having a second resistance through which the pixel signal current flows; and
   an analog-to-digital converter coupled to said second and third circuits, said analog-to-digital converter being adapted to calibrate the reference signal current by modifying the first resistance based on the difference between the reference signal current and the pixel signal current, wherein said digital representation corresponds to an output of the analog-to-digital converter used to modify the first resistance.

3. The imager device of claim 2 wherein said analog-to-digital converter comprises:
   a first switch connected to the first resistance; and
   a comparator for controlling said first switch with a control signal such that the first resistance may be modified and for outputting the control signal as the digital representation.

4. The imager device of claim 2, further comprising a counter for counting said digital representation to obtain a multi-bit digital code representative of the analog pixel signal.

5. The imager device of claim 4 further comprising:
   a hold register for holding the multi-bit digital code while said first circuit outputs a second digital representation of another analog pixel signal;
   a decoder connected to said hold register for outputting the multi-bit digital code; and
   a current mirror for mirroring the reference signal current to the third circuit.

6. The imager device of claim 1, wherein said first circuit comprises:
   a second circuit having a first switch coupled to a first switchable resistance through which the reference signal current flows, said first switchable resistance being controlled by clock signals operating at a first frequency, said first switch being controlled by a control signal;
   a third circuit having a second switchable resistance through which the pixel signal current flows, said second switchable resistance being controlled by clock signals operating at the first frequency; and
   an analog-to-digital converter coupled to said second and third circuits, said analog-to-digital converter being adapted to calibrate the reference signal current by modifying the first resistance based on the difference between the reference signal current and the pixel signal current by outputting the control signal, said digital representation corresponding to the control signal.

7. The imager device of claim 6, wherein a duty cycle of the control signal corresponds to a level of brightness of the pixel signal.

8. The imager device of claim 6, wherein said analog-to-digital converter comprises:
   a first switch connected to the first switchable resistance; and
   a comparator controlling said first switch with the control signal such that the first resistance may be modified and outputting the control signal as the digital representation.

9. An imager device comprising:
   an array of pixels;
   a first circuit coupled to a pixel of said array, said first circuit converting an analog reference signal voltage into a reference current;
   a second circuit coupled to the pixel, said second circuit converting an analog pixel signal voltage into a pixel current; and
   an analog-to-digital converter coupled to said first and second circuits, said analog-to-digital converter modifying a resistance of said first circuit when the reference and pixel currents are not equal and outputting a digital value corresponding to the analog pixel signal voltage based on a difference of said currents.

10. The imager device of claim 9 wherein said analog-to-digital converter comprises:
    a first switch connected to the first resistance; and
    a comparator for controlling said first switch with a control signal such that the first resistance is modified and for outputting the control signal as the digital representation.

11. The imager device of claim 9 further comprising a counter for counting said digital value to obtain a multi-bit digital code representative of the analog pixel signal.

12. The imager device of claim 11 further comprising a hold register for holding the multi-bit digital code while said analog-to-digital converter outputs a second digital value for another analog pixel signal.

13. The imager device of claim 12 further comprising a decoder connected to said hold register for outputting the multi-bit digital code.

14. A method of operating an imager, said method comprising the steps of:
    converting a reference signal voltage into a first current;
    converting a pixel signal voltage into a second current;
    calibrating the first current only when the first and second currents are not equal; and
    outputting a digital code representative of the pixel signal based on a difference of the first and second currents.

15. The method of claim 14, wherein said step of converting the reference signal voltage comprises:

inputting the reference signal voltage; and applying the reference signal voltage across a switchable resistance resistor.

16. The method of claim 15, wherein said step of converting the pixel signal voltage comprises:

inputting the pixel signal voltage; and applying the pixel signal voltage across a switchable resistance resistor.

17. The method of claim 15, wherein the step of calibrating the first current comprises adjusting the resistance of the resistor such that the first current substantially equals the second current, wherein said adjusting step comprises:

determining if the first current is greater than the second current; and disconnecting the resistor.

18. The method of claim 15, wherein the step of calibrating the first current comprises adjusting the resistance of the resistor such that the first current substantially equals the second current, wherein said adjusting step comprises:

determining if the first current is greater than the second current;

disconnecting the resistor using a control signal; and outputting the control signal as the digital code.

* * * * *